(12) United States Patent
He (10) Patent No.: US 11,797,584 B2
(45) Date of Patent: Oct. 24, 2023

(54) METHOD, ELECTRONIC DEVICE, AND COMPUTER-READABLE STORAGE MEDIUM FOR DETERMINING ANSWER TO QUESTION OF PRODUCT

(71) Applicant: BEIJING XIAOMI MOBILE SOFTWARE CO., LTD., Beijing (CN)

(72) Inventor: Li He, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 510 days.

(21) Appl. No.: 16/934,499

(22) Filed: Jul. 21, 2020

(65) Prior Publication Data

US 2021/0303605 A1   Sep. 30, 2021

(30) Foreign Application Priority Data

Mar. 31, 2020 (CN) .......................... 202010245790.5

(51) Int. Cl.
 *G06F 16/332* (2019.01)
 *G06Q 30/016* (2023.01)
 *G06N 5/02* (2023.01)

(52) U.S. Cl.
 CPC .......... *G06F 16/3329* (2019.01); *G06N 5/02* (2013.01); *G06Q 30/016* (2013.01)

(58) Field of Classification Search
 CPC ..... G06Q 30/016; G06F 16/3329; G06N 5/02
 See application file for complete search history.

(56) References Cited

U.S. PATENT DOCUMENTS

| | | | |
|---|---|---|---|
| 2015/0142704 A1* | 5/2015 | London | G06Q 10/10 706/11 |
| 2018/0150739 A1* | 5/2018 | Wu | G06N 20/10 |
| 2018/0218374 A1* | 8/2018 | Shah | G06Q 30/016 |
| 2018/0232443 A1 | 8/2018 | Delgo et al. | |
| 2019/0012718 A1* | 1/2019 | Vadlamudi | G06Q 30/0631 |
| 2020/0004873 A1* | 1/2020 | Chang | G06F 16/31 |
| 2020/0004875 A1* | 1/2020 | McAteer | G06F 16/3329 |
| 2021/0232613 A1* | 7/2021 | Raval Contractor | G06F 16/3329 |

FOREIGN PATENT DOCUMENTS

| | | |
|---|---|---|
| WO | 2019051847 A1 | 3/2019 |
| WO | 2019071599 A1 | 4/2019 |

OTHER PUBLICATIONS

Huang, Xiao, et al. "Knowledge graph embedding based question answering." Proceedings of the twelfth ACM international conference on web search and data mining. 2019 (Year: 2019).*

(Continued)

*Primary Examiner* — Brendan S O'Shea
(74) *Attorney, Agent, or Firm* — SYNCODA LLC; Feng Ma (57) ABSTRACT

A method for determining an answer to a question of a product includes: receiving a question for a target product; obtaining a knowledge graph constructed in advance for the target product, in which, the knowledge graph includes entities and a relationship among the entities, and the entities at least include one question for the target product and a corresponding answer; and determining an answer corresponding to the question based on the relationship among the entities included in the knowledge graph.

15 Claims, 7 Drawing Sheets

(56) References Cited

OTHER PUBLICATIONS

Chao, Zhaohui, and Lin Li. "The combination of context information to enhance simple question answering." 2018 5th International Conference on Behavioral, Economic, and Socio-Cultural Computing (BESC). IEEE, 2018. (Year: 2018).*
OA1 for EP application 20188494.7, dated Aug. 20, 2020.

* cited by examiner

METHOD, ELECTRONIC DEVICE, AND COMPUTER-READABLE STORAGE MEDIUM FOR DETERMINING ANSWER TO QUESTION OF PRODUCT

CROSS-REFERENCE TO RELATED APPLICATION

This application claims priority to Chinese Patent Application No. 202010245790.5 filed on Mar. 31, 2020, the disclosure of which is hereby incorporated by reference in its entirety.

BACKGROUND

With the development of consumer electronics, more and more consumers are adopting more and more electronic devices, such as mobile phones and televisions. However, some electronic devices may generate after-sales problems under users' possessions. Some after-sales problems are generated due to quality problems of the electronic devices, and others are generated due to compatibility and functionality problems of the electronic devices.

SUMMARY

The disclosure relates generally to a field of after-sales technologies, and more specifically to a method for determining an answer to a question of a product, an electronic device, and a computer-readable storage medium.

According to a first aspect of the disclosure, there is provided a method for determining an answer to a question of a product. The method includes: receiving a question for a target product; obtaining a knowledge graph constructed in advance for the target product, in which, the knowledge graph includes entities and a relationship among the entities, and the entities at least include one question for the target product and a corresponding answer; and determining an answer corresponding to the question based on the relationship among the entities included in the knowledge graph.

According to a second aspect of the disclosure, there is provided an electronic device. The electronic device includes: a processor and a memory. The memory is configured to store instructions executed by the processor. The processor is configured to implement the method according to the above embodiments.

According to a third aspect of the disclosure, there is provided a non-transitory computer-readable storage medium having stored therein instructions that, when executed by a processor of an electronic device, leads the electronic device to perform the above method.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure, and serve to explain the principles of the disclosure together with the description.

DETAILED DESCRIPTION

Exemplary embodiments will be described in detail herein, examples of which are illustrated in the accompanying drawings. When the following description refers to the accompanying drawings, the same or similar elements may be denoted by the same or similar numbers in different accompanying drawings, unless otherwise indicated. The embodiments described in the following exemplary embodiments do not represent all embodiments consistent with the disclosure. Instead, they are merely examples of apparatus and methods consistent with aspects of the disclosure as detailed in the appended claims.

A large number of after-sales problems bring great challenges to an after-sales department and a research and development department of a product manufacturer. The after-sales problems are solved in a conventional manual way, causing a lower efficiency and a higher labor cost. However, in a normal circumstance, an after-sales personnel may only query a keyword of a problem of the customer based on the description for a product specification, thereby outputting a corresponding answer. There is nothing the after-sales personnel may do about a plurality of compatibility problems and special usage scenarios. When the after-sales problem is submitted to the research and development personnel, it will further take up time from the research and development personnel. However, a procedure for solving the after-sales problem by the research and development personnel is relatively long. The main reason is that there is a difference between a scenario in which the research and development personnel reproduces the after-sales problem and a scenario in which the problem may be generated during an actual use process of the user. Moreover, most of the after-sales problems of users are caused by improper use of the users or influences of third-party peripherals on the electronic products. These after-sales problems are difficult for the research and development personnel to locate. Even if the research and development personnel may locate these after-sales problems, a locating period is very long, causing a vicious circle of complaining of the users.

To overcome the above problems, a robot answering system may be adopted to automatically output an answer to the after-sales problem. In a typical robot answering system, a key information point may be determined from a problem in a standard format. However, most of the problems raised by the users are not in the standard format, but in a relatively random language and speech, which makes it difficult for the robot answering system to obtain the key information point of the problems raised by the users and to provide correct answers. As a result, most users finally choose manual after-sales service, but the manual after-sales service needs to find the answer manually, and the outputted answer has a great limitation with a relatively low speed and accuracy.

Figure 1:
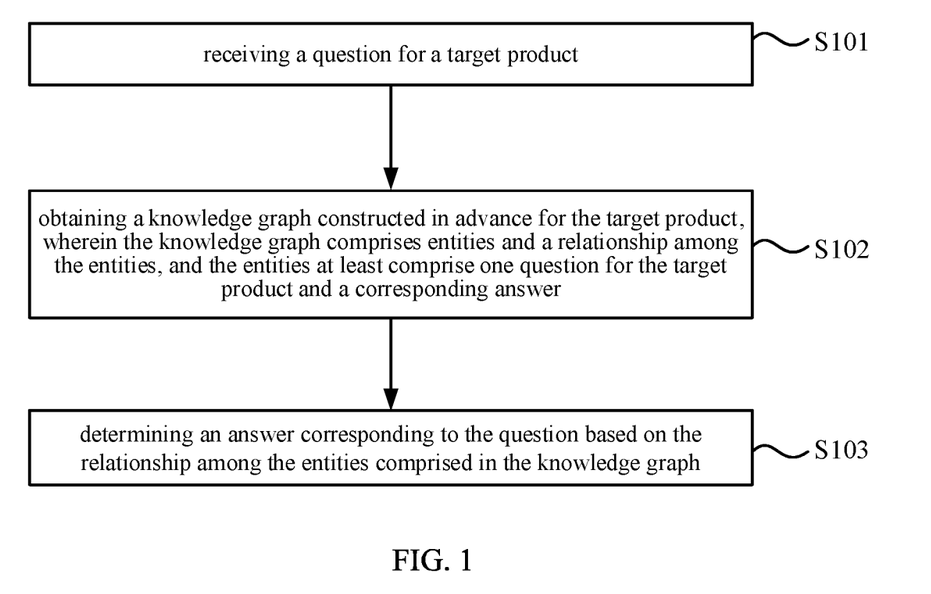
FIG. 1 is a flowchart illustrating a method for determining an answer to a question of a product according to some embodiments of the disclosure.

FIG. 1 is a flowchart illustrating a method for determining an answer to a question of a product according to some embodiments of the disclosure. The method illustrated in this embodiment may be applicable to a device of an after-sales personnel, such that the after-sales personnel may obtain an answer to a question raised by a user, may also be applicable to a device of a user who purchases a product, such that the user obtains an answer to a question raised by the user, and may also be applicable to a device of a research and development personnel, such that the research and development personnel may analyze a question based on an answer of the question.

Some examples are described below with respect to a method being applied to the device of the after-sales personnel according to some embodiments.

As illustrated in FIG. 1, the method for determining the answer of the problem of the product can include following operations or blocks.

At block S101, a question for a target product is received.

At block S102, a knowledge graph constructed in advance for the target product is obtained. The knowledge graph includes entities and a relationship among the entities, and the entities at least includes one question for the target product and a corresponding answer.

At block S103, an answer corresponding to the question is determined based on the relationship among the entities included in the knowledge graph.

In an embodiment, the target product may refer to a certain type of products, such as a mobile phone, a television, an air conditioner, and a washing machine, or a specific model of products in a certain type of products, such as a mobile phone with an ABC-X model.

A question may be generated when the user is using the target product, such as, a question for a structural damage of the target product, a question for reporting an error when the target product is in use, and a question which needs a guide on how to use a certain function of the target product.

In an embodiment, a question about the target product may be collected in advance as a sample question, and an answer corresponding to the sample question may be taken as a sample answer. Then a correlation between the sample question and the sample answer may be determined. The correlation is taken as an edge, and the sample question and the sample answer are taken as the entities, to generate the knowledge graph.

In an embodiment, the sample question and the sample answer may be obtained from the after-sales personnel. For example, the voice of the after-sales personnel when receiving a call from the user can be recorded, so as to record the question raised by the user as a sample question, and the answer provided to the user by the after-sales personnel as the sample answer.

In an embodiment, the sample question and the sample answer may be obtained from a forum (community). For example, a question about the target product published by a user in the community may be obtained as the sample question, and contents of a response to the question in the forum may be taken as the sample answer.

Therefore, existing questions may be used as the sample questions and existing answers may be used as the sample answers to construct the knowledge graph without manually setting questions and making corresponding answers, thereby greatly saving a workload of generating the knowledge graph.

The after-sales personnel may input the question into the knowledge graph after receiving the question raised by the user. The knowledge graph may query an answer related to the inputted question based on the inputted question, and output the queried answer based on the relationship among the entities included in the knowledge graph, thereby displaying the queried answer to the after-sales personnel.

According to embodiments of the disclosure, the knowledge graph including the question, the answer, and the relationship between the question and the answer which has been constructed firstly. The answer may be queried fast and accurately for the after-sales personnel through the knowledge graph when the question is received, such that the after-sales personnel give the answer fast and accurately to the question raised by the user, and a satisfaction level of the user with the product is improved.

Figure 2:
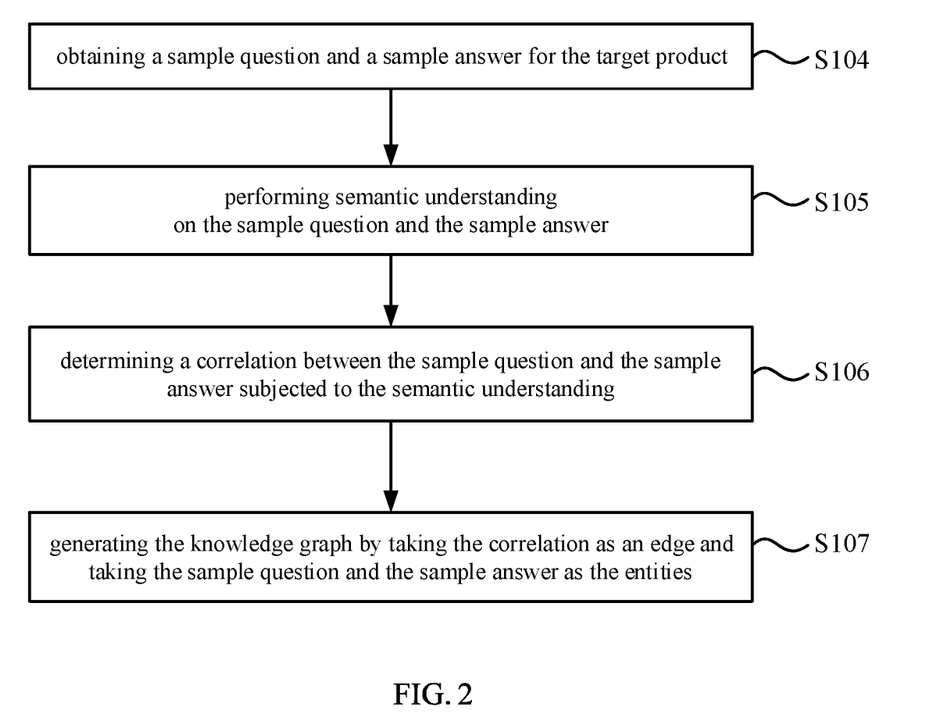
FIG. 2 is a flowchart illustrating constructing a knowledge graph according to some embodiments of the disclosure.
Figure 3:
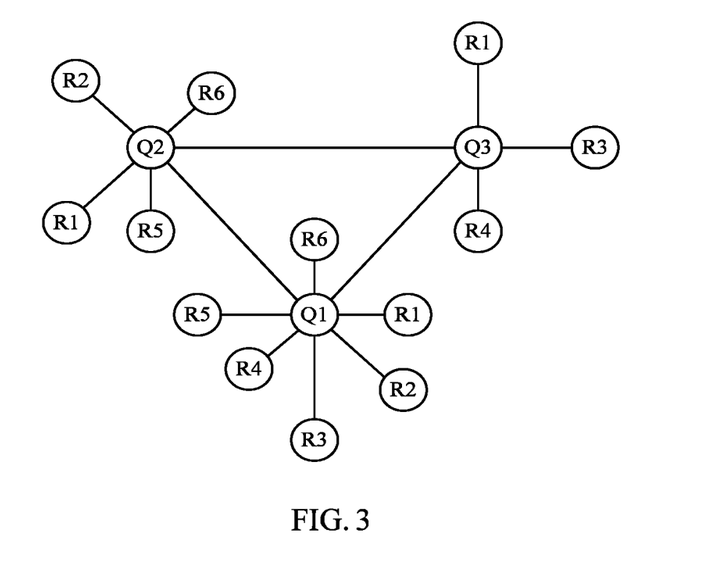
FIG. 3 is a schematic diagram illustrating a part of a knowledge graph according to some embodiments of the disclosure.

FIG. 2 is a flowchart illustrating constructing a knowledge graph according to some embodiments of the disclosure. FIG. 3 is a schematic diagram illustrating a part of a knowledge graph according to some embodiments of the disclosure.

As illustrated in FIG. 2, the knowledge graph is constructed by following actions in advance.

At block S104, a sample question and a sample answer for the target product are obtained.

At block S105, semantic understanding is performed on the sample question and the sample answer.

At block S106, a correlation between the sample question and the sample answer subjected to the semantic understanding is determined.

At block S107, the knowledge graph is generated by taking the correlation as an edge and taking the sample question and the sample answer as the entities.

In an embodiment, the sample question and the sample answer for the target product are obtained. For example, the obtained sample question may include the question in the forum for the target product, and may also include the question received after sales for the target product. The obtained sample answer may include the answer to the question in the forum for the target product, and may also include the answer to the question received after sales for the target product.

Alternatively, determining the correlation between the sample question and the sample answer subjected to the semantic understanding includes: determining the correlation between the sample question and the sample answer subjected to the semantic understanding based on an angle and/or distance between a question word vector corresponding to the sample question and an answer word vector corresponding to the sample answer.

In an embodiment, the semantic understanding may be performed on the sample question and the sample answer. A statement with an irregular syntax is converted into a statement with a regular syntax, for example, it is converted into a statement in a subject-predicate-object (SPO) form. S represents the subject, P represents the predicate, and O represents the object. The sample question and the sample answer subjected to the semantic understanding may be summarized as SPO language fragments. The SPO language fragment may be represented as a word vector {S, P, O}.

The correlation between the sample question and the sample answer subjected to the semantic understanding may further be determined. For example, the angle and/or distance between the question word vector corresponding to the sample question and the answer word vector corresponding to the sample answer may be calculated, and a correlation between every sample question and every sample answer may be determined based on a calculation result. For example, the smaller the angle between the question word vector and the answer word vector, the greater the correlation is, and the smaller the distance between the question word vector and the answer word vector, the greater the correlation is.

Q represents the sample question, R represents the sample answer, and s represents a time correlation between the sample question and the sample answer. The correlation may be represented by a three-component group {Q, R, s}. Based on a value of s, the correlation between the sample question and the sample answer may be divided into a strong correlation (e.g., s is greater than a first preset value), a weak correlation (e.g., s is smaller than the first preset value and greater than a second preset value), and an irrelevant (e.g., s is smaller than the second preset value).

Based on a requirement a strong correlation can be set. Or there is an edge between the sample answer and the sample question of strong correlation and weak correlation, and the correlation is expressed by the length of the edge. Therefore, the knowledge graph is generated using the correlation degree as an edge, and the sample question and the sample answer as entities.

As illustrated in FIG. 3, the knowledge graph may include three sample questions Q1, Q2, and Q3, and six sample answers R1, R2, R3, R4, R5, and R6. All the six sample answers are related to Q1, and R6 has the highest correlation with Q1. R1, R3 and R4 are related to Q3, and R4 has the highest correlation with Q3. R1, R2, R5 and R6 are related to Q2, and R6 has the highest correlation with Q2.

In addition to the correlation between the sample question and the sample answer, there may also be a correlation between the sample questions, that is, in the knowledge graph, the edge may be established between the sample questions based on the correlation between the sample questions to facilitate an expansion of the knowledge graph.

Alternatively, the sample question includes a question received from a public media for the target product, and/or a question received after sales for the target product. The sample answer includes an answer corresponding to the question received from the public media for the target product, and/or an answer corresponding to the question received after sales for the target product.

In an embodiment, the sample questions and the sample answers may be obtained by an after-sales personnel. For example, the voice of the after-sales personnel when receiving a call from a user can be recorded, so as to record the questions raised by the user as sample questions, and the answers provided to the user by the after-sale personnel as sample answers.

In an embodiment, the sample question and the sample answer may come from the public media. The public media may be a forum (community), a comment section for the target product on an official website, and a comment section for the target product on a third-party shopping website. For example, a question about the target product, published by a user in the forum, may be obtained as a sample question, and contents of a response to the question in the forum may be taken as the sample answer.

Based on this, since the content in the public media is an existing content, the existing questions may be used as the sample questions, and the existing answers may be used as the sample answers to construct the knowledge graph, which may greatly save a workload of generating the knowledge graph without manually setting the questions and making the corresponding answers.

Figure 4:
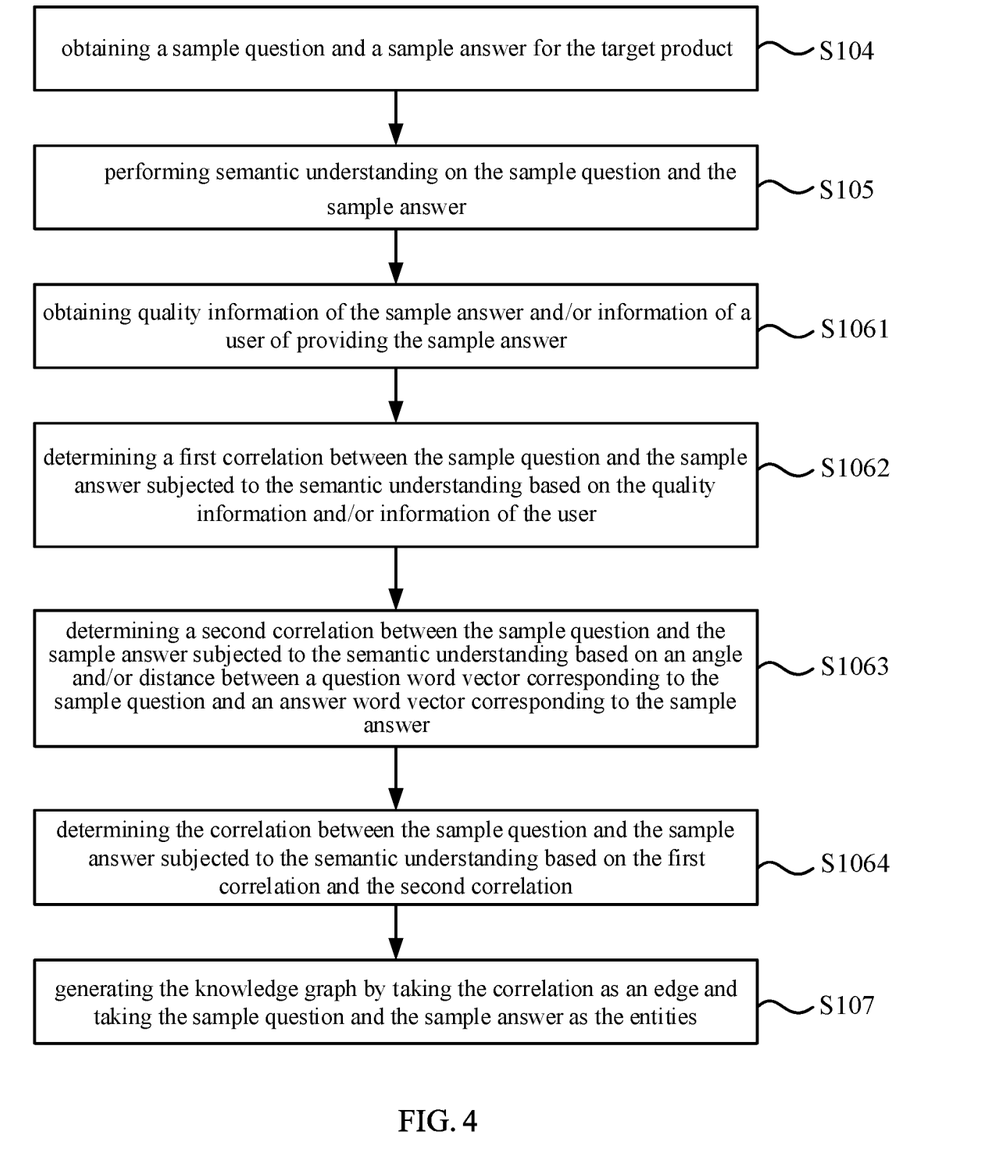
FIG. 4 is a flowchart illustrating constructing a knowledge graph according to some other embodiments of the disclosure.

FIG. 4 is a flowchart illustrating constructing a knowledge graph according to some other embodiments of the disclosure. As illustrated in FIG. 4, determining the correlation between the sample question and the sample answer subjected to the semantic understanding includes the following.

At block 1061, quality information of the sample answer and/or information of a user providing the sample answer are obtained.

At block 1062, a first correlation between the sample question and the sample answer subjected to the semantic understanding is determined based on the quality information and/or information of the user.

At block 1063, a second correlation between the sample question and the sample answer subjected to the semantic understanding is determined based on an angle and/or distance between a question word vector corresponding to the sample question and an answer word vector corresponding to the sample answer.

At block 1064, the correlation between the sample question and the sample answer subjected to the semantic understanding is determined based on the first correlation and the second correlation.

In an embodiment, the correlation between the sample answer and the sample question is not only related to the relationship between the answer word vector corresponding to the sample answer and the question word vector corresponding to the sample question, but also to a feature of the sample question.

Since the sample question is answered by replies from a large number of the after-sales personnel or the users, the quality of the answers can be good or bad. For example, the sample question comes from the after-sales response to the user question, then the quality of the sample answer can be determined based on the user's rating of the after-sale. The higher the score, the higher the quality For example, the closer a publication time of the sample answer is to a current time, the higher the quality of the sample answer. For example, when the sample answer comes from the forum, information of the user who publishes the sample answer may be obtained. In detail, the number of target products or related products that the user purchased may be obtained. The more the purchased target products or related products, the higher the quality of the published sample answer is.

Therefore, in this embodiment, on one hand, based on the quality information and/or information of the user, the first correlation between the sample question and the sample answer subjected to the semantic understanding may be determined. For example, the higher the quality of an answer, the greater the first correlation degree between the answer as the sample answer and the sample question is. For another example, the more the number of target products or related products that the user purchased, the greater the first correlation between the answer published by the user as the sample answer and the sample question is. On the other hand, the second correlation between the sample question and the sample answer subjected to the semantic understanding is determined based on the angle and/or distance between the question word vector and the answer word vector. Further, the correlation between the sample question and the sample answer subjected to the semantic understanding is determined based on the first correlation and the second correlation. For example, weights may be respectively set for the first correlation and the second correlation, and then the first correlation and the second correlation are weighted and summed based on the set weights to obtain a result, and the obtained result is taken as the correlation between the sample question and the sample answer subjected to the semantic understanding.

Considering a plurality of factors comprehensively, the determined correlation between the sample question and the sample answer is more consistent with reality.

Figure 5:
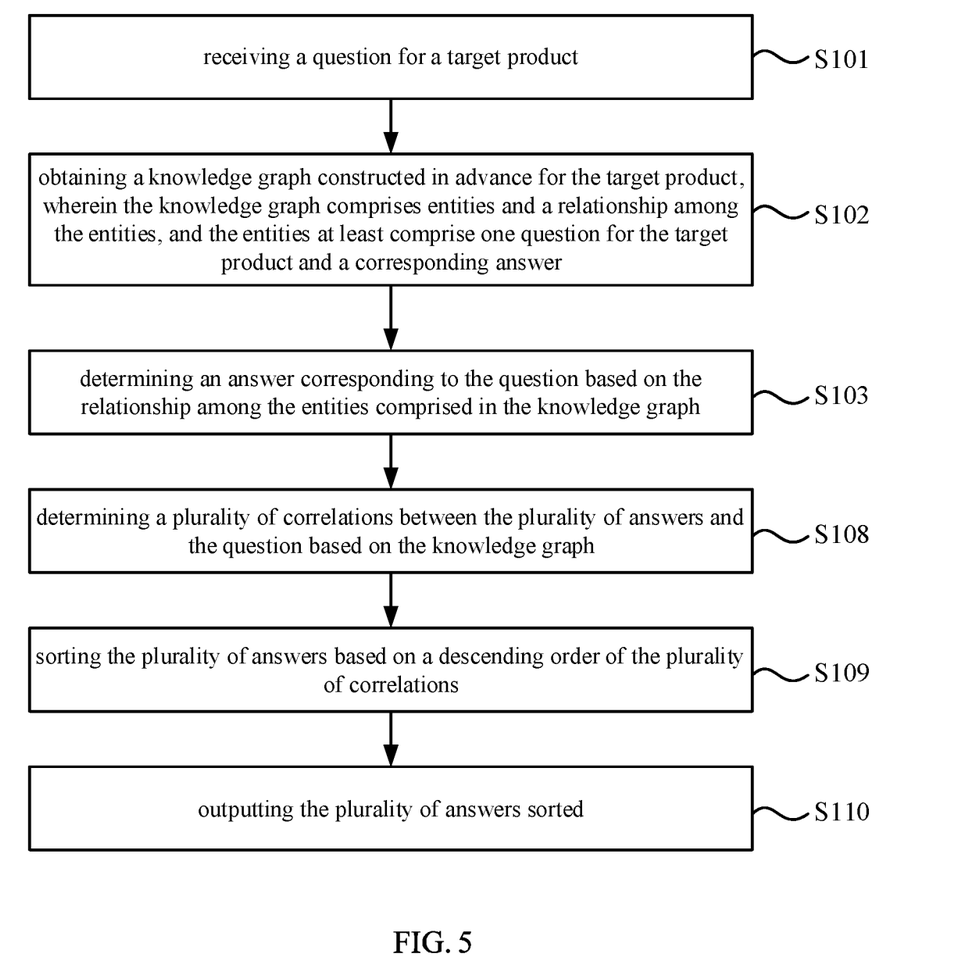
FIG. 5 is a flowchart illustrating a method for determining an answer to a question of a product according to some other embodiments of the disclosure.

FIG. 5 is a flowchart illustrating a method for determining an answer to a question of a product according to some other embodiments of the disclosure. As illustrated in FIG. 5, in a case that there are a plurality of answers (i.e., it is determined that there are a plurality of answers to the question based on the relationship between the entities included in the knowledge graph), the method also includes the following.

At block 8108, a plurality of correlations between the plurality of answers and the question are determined based on the knowledge graph.

At block 8109, the plurality of answers are sorted based on a descending order of the plurality of correlations.

At block 8110, the plurality of sorted answers are outputted. For example, the plurality of sorted answers are outputted in a form such as images or voices.

In an embodiment, there may be a plurality of answers related to the question. For the plurality of answers, a correlation between each answer and the question may be determined based on the knowledge graph. An edge of the knowledge graph may represent the correlation between the answer and the problem, and may be determined when the knowledge graph is constructed. For example, based on the above embodiments, the correlation between the sample question and the sample answer subjected to the semantic understanding may be determined based on the angle and/or distance between the question word vector corresponding to the sample question and the answer word vector corresponding to the sample answer, and may also be determined based on the first correlation and the second correlation.

Then, the plurality of answers are sorted based on the descending order of the plurality of correlations. For example, the answers that are more relevant to the question are ranked higher, and then the sorted multiple answers are displayed, so that the after-sales staff can quickly determine which answers are related to the question to facilitate accurate and quick responses to the user.

Figure 6:
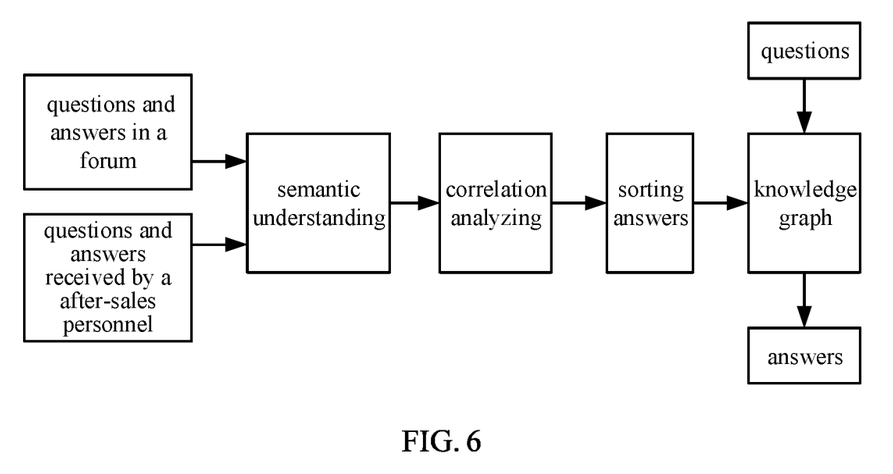
FIG. 6 is a flowchart illustrating a method for determining an answer to a question of a product according to still some other embodiments of the disclosure.

FIG. 6 is a flowchart illustrating a method for determining an answer to a question of a product according to still some other embodiments of the disclosure.

As illustrated in FIG. 6, firstly, questions and answers published by users in the forum may be collected, and questions raised by users after sales and answers relied to users by the after-sales personnel may be collected.

The collected questions are taken as sample questions, the collected answers are taken as sample answers, semantic understanding is performed on the sample questions and the sample answers, and a question word vector corresponding to each sample question and an answer word vector corresponding to each sample answer may be determined through the semantic understanding.

Furthermore, based on data such as an angle and distance between the question word vector and the answer word vector, a correlation between each sample question and each sample answer are determined (which may be realized by a reading comprehension device).

For the correlation between the sample question and the sample answer, quality information of the sample answer and information of the user who publishes the sample answer may also be considered, and then the correlation may be comprehensively determined based on the quality information and the user information.

The determined correlation is taken as an edge, and the sample question and the sample answer are taken as entities, to generate the knowledge graph. For different target products, there are different sample questions and different sample answers. Therefore, for different target products, different knowledge graphs may be constructed.

When the question for the target product is received, the question may be inputted to the knowledge graph corresponding to the target product, to obtain the answer corresponding to the question.

Corresponding to the above embodiment of the method for determining the answer to the question of the product, the disclosure also provides an embodiment of an apparatus for determining an answer to a question of a product.

Figure 7:
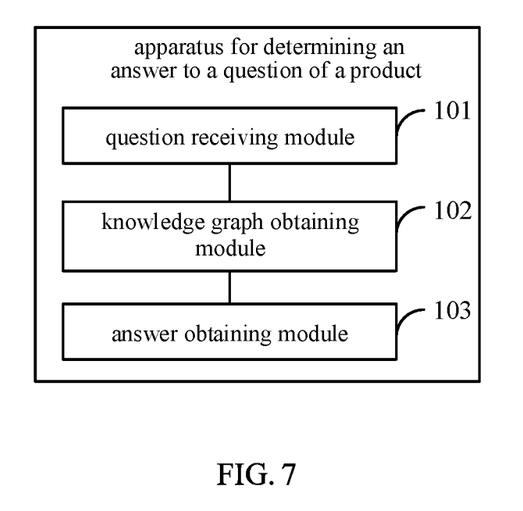
FIG. 7 is a block diagram illustrating an apparatus for determining an answer to a question of a product according to some embodiments of the disclosure.

FIG. 7 is a block diagram illustrating an apparatus for determining an answer to a question of a product according to some embodiments of the disclosure. The apparatus illustrated in this embodiment may be applicable to a device of an after-sales personnel, such that the after-sales personnel may obtain an answer to a question raised by a user, may also be applicable to a device of a user who purchases a product, such that the user obtains an answer to a question raised by the user, and may also be applicable to a device of a research and development personnel, such that the research and development personnel may analyze a question based on an answer of the question.

As illustrated in FIG. 7, the apparatus for determining the answer to the question of the product includes a question receiving module 101, a knowledge graph obtaining module 102, and an answer obtaining module 103.

The question receiving module 101 is configured to receive a question for a target product.

The knowledge graph obtaining module 102 is configured to obtain a knowledge graph constructed in advance for the target product, in which, the knowledge graph includes entities and relationships among the entities, and the entities at least include one question for the target product and a corresponding answer.

The answer obtaining module 103 is configured to determine an answer corresponding to the question based on the relationship among the entities included in the knowledge graph.

Figure 8:
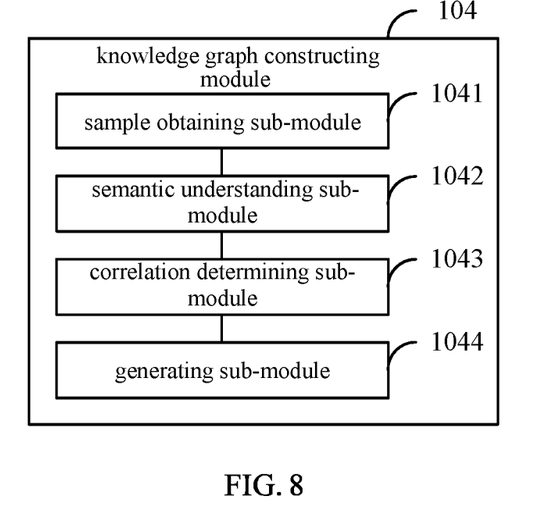
FIG. 8 is a block diagram illustrating a knowledge graph constructing module according to some embodiments of the disclosure.

FIG. 8 is a block diagram illustrating a knowledge graph constructing module according to some embodiments of the disclosure. As illustrated in FIG. 8, the apparatus also includes: a knowledge graph constructing module 104.

The knowledge graph constructing module 104 includes: a sample obtaining sub-module 1041, a semantic understanding sub-module 1042, a correlation determining sub-module 1043, and a generating sub-module 1044.

The sample obtaining sub-module 1041 is configured to obtain a sample question and a sample answer for the target product.

The semantic understanding sub-module 1042 is configured to perform semantic understanding on the sample question and the sample answer.

The correlation determining sub-module 1043 is configured to determine a correlation between the sample question and the sample answer subjected to the semantic understanding.

The generating sub-module 1044 is configured to generate the knowledge graph by taking the correlation as an edge and taking the sample question and the sample answer as the entities.

Alternatively, the correlation determining sub-module is configured to: determine the correlation between the sample question and the sample answer subjected to the semantic understanding based on an angle and/or distance between a question word vector corresponding to the sample question and an answer word vector corresponding to the sample answer.

Alternatively, the semantic understanding sub-module is configured to: obtain quality information of the sample answer and/or information f a user providing the sample answer; determine a first correlation between the sample question and the sample answer subjected to the semantic understanding based on the quality information and/or information of the user; determine a second correlation between the sample question and the sample answer subjected to the semantic understanding based on an angle and/or distance between a question word vector corresponding to the sample question and an answer word vector corresponding to the sample answer; and determine the correlation between the sample question and the sample answer subjected to the semantic understanding based on the first correlation and the second correlation.

Alternatively, the sample question includes a question received from a public media for the target product, and/or a question received after sales for the target product; and the sample answer includes an answer corresponding to the question received from the public media for the target product, and/or an answer corresponding to the question received after sales for the target product.

Figure 9:
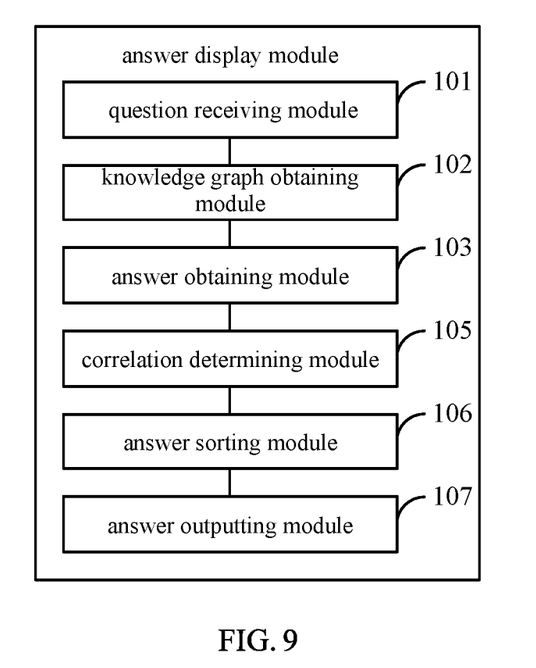
FIG. 9 is a block diagram illustrating an answer display module according to some embodiments of the disclosure.

FIG. 9 is a block diagram illustrating an answer display module according to some embodiments of the disclosure. As illustrated in FIG. 9, in response to determining a plurality of answers, the apparatus also includes: a correlation determining module 105, an answer sorting module 106, and an answer outputting module 107.

The correlation determining module 105 is configured to determine a plurality of correlations between the plurality of answers and the question based on the knowledge graph.

The answer sorting module 106 is configured to sort the plurality of answers based on a descending order of the plurality of correlations.

The answer outputting module 107 is configured to output the sorted plurality of answers.

For the apparatus in the above embodiment, detailed ways for respective modules to perform operation are described in detail in the above methods, which are not elaborated in detail herein.

Since the embodiments of the apparatus basically correspond to the embodiments of the method, partial description of the embodiment of the method may be referred to for relevant information. The embodiments of the apparatus described above are only exemplary. The modules described as separate components may or may not be physically separated, and the components displayed as modules may or may not be physical modules, i.e. may be located in one place or may be distributed over a plurality of network modules. Some or all of the modules may be selected based on an actual requirement to achieve a purpose of a solution of this embodiment. The skilled in the art may understand and implement the solution of this embodiment without creative labor.

Embodiments of the disclosure also provide an electronic device. The electronic device includes a processor and a memory. The memory is configured to store instructions executed by the processor. The processor is configured to implement the method according to any of the above embodiments.

Figure 10:
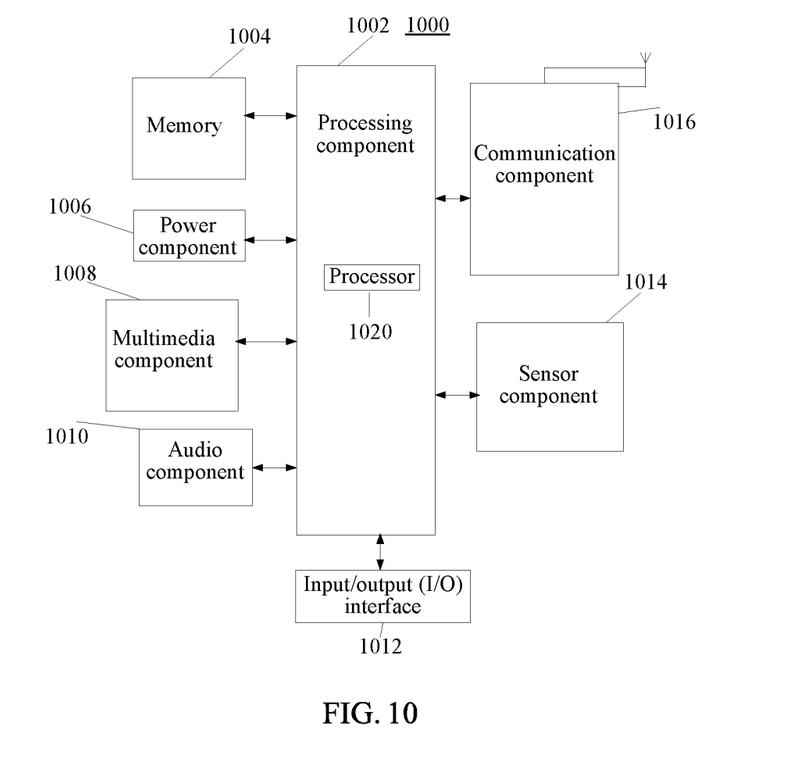
FIG. 10 is a block diagram illustrating a device for determining an answer to a question of a product according to some embodiments of the disclosure.

FIG. 10 is a block diagram illustrating a device 1000 for determining an answer to a question of a product according to some embodiments of the disclosure. For example, the device 1000 may be a mobile phone, a computer, a digital broadcasting terminal, a message sending and receiving equipment, a game controller, a tablet device, a medical device, a fitness equipment, a personal digital assistant, or the like.

As illustrated in FIG. 10, the device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the device 1000, such as the operations associated with display, telephone calls, data communications, camera operations, and recording operations. The processing component 1002 may include one or more processors 1020 to execute instructions to perform all or part of the steps in the above described methods. Moreover, the processing component 1002 may include one or more modules which facilitate the interaction between the processing component 1002 and other components. For example, the processing component 1002 may include a multimedia module to facilitate the interaction between the multimedia component 1008 and the processing component 1002.

The memory 1004 is configured to store various types of data to support the operation of the device 1000. Examples of such data include instructions for any applications or methods operated on the device 1000, contraction data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the device 1000. The power component 1006 may include a power management system, one or more power sources, and any other components associated with the generation, management, and distribution of power in the device 1000.

The multimedia component 1008 includes a screen providing an output interface between the device 1000 and the user. In some embodiments, the screen may include a liquid crystal display (LCD) and a touch panel (TP). In some embodiments, an organic light-emitting diode (OLED) display or other types of displays may be employed.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1008 includes a front camera and/or a rear camera. The front camera and the rear camera may receive an external multimedia datum while the device 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 includes a microphone ("MIC") configured to receive an external audio signal when the device 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker to output audio signals.

The I/O interface 1012 provides an interface between the processing component 1002 and peripheral interface modules, such as a keyboard, a click wheel, buttons, and the like. The buttons may include, but be not limited to, a home button, a volume button, a starting button, and a locking button.

The sensor component 1014 includes one or more sensors to provide status assessments of various aspects of the device 1000. For example, the sensor component 1014 may detect an open/closed status of the device 1000, relative positioning of components, e.g., the display and the keypad of the device 1000, a change in position of the device 1000 or a component of the device 1000, a presence or absence of user contraction with the device 1000, an orientation or an acceleration/deceleration of the device 1000, and a change in temperature of the device 1000. The sensor component 1014 may include a proximity sensor configured to detect the presence of nearby objects without any physical contact. The sensor component 1014 may also include a light sensor, such as a CMOS (complementary metal-oxide-semiconductor)) or CCD (charge coupled device) image sensor, for use in imaging applications. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the device 1000 and other devices. The device 1000 can access a wireless network based on a communication standard, such as Wi-Fi, 2G, 3G, 4G, 5G, or a combination thereof. In one exemplary embodiment, the communication component 1016 receives a broadcast signal or broadcast associated information from an external broadcast management system via a broadcast channel. In one exemplary embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In one or more exemplary embodiments, the device 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In one or more exemplary embodiments, there is also provided a non-transitory computer-readable storage medium including instructions, such as included in the memory 1004, executed by the processor 1020 in the device 1000, for performing the above-described methods. For example, the non-transitory computer-readable storage medium may be a ROM, a RAM, a CD-ROM, a magnetic tape, a floppy disc, an optical data storage device, and the like.

The various device components, modules, units, blocks, or portions may have modular configurations, or are composed of discrete components, but nonetheless can be referred to as "modules" in general. In other words, the "components," modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for determining an answer to a question of a product, comprising:
receiving a question for a target product;
obtaining a knowledge graph constructed in advance for the target product, wherein the knowledge graph comprises entities and a relationship among the entities, and the entities at least comprise one question for the target product and a corresponding answer;
determining an answer corresponding to the question based on the relationship among the entities comprised in the knowledge graph;
wherein the knowledge graph is constructed in advance by:
obtaining a sample question and a sample answer for the target product;
performing semantic understanding on the sample question and the sample answer by converting a statement with an irregular syntax into a statement with a regular syntax including a statement in a subject-predicate-object (SPO) form;
determining a correlation between the sample question and the sample answer subjected to the semantic understanding; and
generating the knowledge graph by taking a degree of the correlation as a length of an edge and taking the sample question and the sample answer as the entities;
wherein the method further comprises outputting the answer through at least one of an audio signal and a visual signal;
wherein the method is implemented in an after-sales support computer system comprising:
one or more processing circuits configured to implement operations of the method;
a display screen configured to display the visual signal for outputting the answer;
a speaker configured to output the audio signal for outputting the answer;
wherein
the question is a sample question and comprises at least one of:
a question for a structural damage of the target product;
a question for reporting an error when the target product is in use; and
a question that needs guidance on how to use a certain function of the target product;
the question is obtained through after-sales personnel receiving at least one of a voice call from a user of the target product, and a forum;
the answer is a sample answer;
the one or more processing circuits are further configured to
summarize the sample question and the sample answer subjected to the semantic understanding as SPO language fragments represented as word vectors $\{S, P, O\}$,
calculate an angle and/or distance between a question word vector corresponding to the sample question and an answer word vector corresponding to the sample answer;
determine a correlation between every sample question and every sample answer based on a calculation result, with smaller angle between the question word vector and the answer word vector and smaller distance between the question word vector and the answer word vector representing greater correlation;
wherein
the correlation is represented by a three-component group $\{Q, R, s\}$, where Q represents the sample question, R represents the sample answer, and s represents a correlation between the sample question and the sample answer; and
based on a value of s, the correlation between the sample question and the sample answer is classified as a strong correlation when s is greater than a first preset value, a weak correlation when s is smaller than the first preset value and greater than a second preset value, and irrelevant when s is smaller than the second preset value.

2. The method of claim 1, wherein the determining the correlation between the sample question and the sample answer subjected to the semantic understanding comprises:
determining the correlation between the sample question and the sample answer subjected to the semantic understanding based on the angle and/or distance.

3. The method of claim 1, wherein the determining the correlation between the sample question and the sample answer subjected to the semantic understanding comprises:
obtaining quality information of the sample answer and/or information of a user providing the sample answer;
determining a first correlation between the sample question and the sample answer subjected to the semantic understanding based on the quality information and/or information of the user;
determining a second correlation between the sample question and the sample answer subjected to the semantic understanding based on an angle and/or distance between a question word vector corresponding to the sample question and an answer word vector corresponding to the sample answer; and
determining the correlation between the sample question and the sample answer subjected to the semantic understanding based on the first correlation and the second correlation.

4. The method of claim 1, wherein the sample question comprises a question received from a public media for the target product, and/or a question received after sales for the target product; and
the sample answer comprises an answer corresponding to the question received from the public media for the target product, and/or an answer corresponding to the question received after sales for the target product.

5. The method of claim 1, wherein, in response to determining a plurality of answers, the method further comprises:
determining a plurality of correlations between the plurality of answers and the question based on the knowledge graph;
sorting the plurality of answers based on a descending order of the plurality of correlations; and
outputting the plurality of answers sorted.

6. An after-sales support computer system, comprising:
a processor; and
memory storing instructions for execution by the processor;
wherein the processor is configured to:
receive a question for a target product;
obtain a knowledge graph constructed in advance for the target product, wherein the knowledge graph comprises entities and a relationship among the entities, and the entities at least comprise one question for the target product and a corresponding answer;
determine an answer corresponding to the question based on the relationship among the entities comprised in the knowledge graph;
wherein the processor is further configured to construct the knowledge graph in advance by:
obtaining a sample question and a sample answer for the target product;
performing semantic understanding on the sample question and the sample answer by converting a statement with an irregular syntax into a statement with a regular syntax including a statement in a subject-predicate-object (SPO) form;
determining a correlation between the sample question and the sample answer subjected to the semantic understanding; and
generating the knowledge graph by taking a degree of the correlation as a length of an edge and taking the sample question and the sample answer as the entities;
wherein the after-sales support computer system is configured to output answer through at least one of an audio signal and a visual signal, and comprises:
one or more processing circuits configured to implement operations of the method;
a display screen configured to display the visual signal for outputting the answer;
a speaker configured to output the audio signal for outputting the answer;
wherein
the question is a sample question and comprises at least one of:
a question for a structural damage of the target product;
a question for reporting an error when the target product is in use; and
a question that needs guidance on how to use a certain function of the target product;
the question is obtained through after-sales personnel receiving at least one of a voice call from a user of the target product, and a forum;
the answer is a sample answer;
the one or more processing circuits are further configured to
summarize the sample question and the sample answer subjected to the semantic understanding as SPO language fragments represented as word vectors $\{S, P, O\}$,
calculate an angle and/or distance between a question word vector corresponding to the sample question and an answer word vector corresponding to the sample answer;
determine a correlation between every sample question and every sample answer based on a calculation result, with smaller angle between the question word vector and the answer word vector and smaller distance between the question word vector and the answer word vector representing greater correlation;
wherein
the correlation is represented by a three-component group $\{Q, R, s\}$, where Q represents the sample question, R represents the sample answer, and s represents a correlation between the sample question and the sample answer; and
based on a value of s, the correlation between the sample question and the sample answer is classified as a strong correlation when s is greater than a first preset value, a weak correlation when s is smaller than the first preset value and greater than a second preset value, and irrelevant when s is smaller than the second preset value.

7. The electronic device of claim 6, wherein the determining the correlation between the sample question and the sample answer subjected to the semantic understanding comprises:
determining the correlation between the sample question and the sample answer subjected to the semantic understanding based on the angle and/or distance.

8. The electronic device of claim 6, wherein the determining the correlation between the sample question and the sample answer subjected to the semantic understanding comprises:

obtaining quality information of the sample answer and/or information of a user providing the sample answer;

determining a first correlation between the sample question and the sample answer subjected to the semantic understanding based on the quality information and/or information of the user;

determining a second correlation between the sample question and the sample answer subjected to the semantic understanding based on an angle and/or distance between a question word vector corresponding to the sample question and an answer word vector corresponding to the sample answer; and determining the correlation between the sample question and the sample answer subjected to the semantic understanding based on the first correlation and the second correlation.

9. The electronic device of claim 6, wherein the sample question comprises a question received from a public media for the target product, and/or a question received after sales for the target product; and the sample answer comprises an answer corresponding to the question received from the public media for the target product, and/or an answer corresponding to the question received after sales for the target product.

10. The electronic device of claim 6, wherein in response to determining a plurality of answers, the processor is further configured to:

determine a plurality of correlations between the plurality of answers and the question based on the knowledge graph;

sort the plurality of answers based on a descending order of the plurality of correlations; and output the plurality of answers sorted.

11. A non-transitory computer-readable storage medium having stored therein instructions that, when executed by a processor of an electronic device, causes the electronic device to perform a method for determining an answer to a question of a product, the method comprising:

receiving a question for a target product;

obtaining a knowledge graph constructed in advance for the target product, wherein the knowledge graph comprises entities and a relationship among the entities, and the entities at least comprise one question for the target product and a corresponding answer;

determining an answer corresponding to the question based on the relationship among the entities comprised in the knowledge graph;

wherein the method further comprises constructing the knowledge graph in advance by:

obtaining a sample question and a sample answer for the target product;

performing semantic understanding on the sample question and the sample answer by converting a statement with an irregular syntax into a statement with a regular syntax including a statement in a subject-predicate-object (SPO) form;

determining a correlation between the sample question and the sample answer subjected to the semantic understanding; and generating the knowledge graph by taking a degree of the correlation as a length of an edge and taking the sample question and the sample answer as the entities;

wherein the method further comprises outputting the answer through at least one of an audio signal and a visual signal;

wherein the method is implemented in an after-sales support computer system comprising:

one or more processing circuits configured to implement operations of the method;

a display screen configured to display the visual signal for outputting the answer;

a speaker configured to output the audio signal for outputting the answer;

wherein the question is a sample question and comprises at least one of:

a question for a structural damage of the target product;

a question for reporting an error when the target product is in use; and a question that needs guidance on how to use a certain function of the target product;

the question is obtained through after-sales personnel receiving at least one of a voice call from a user of the target product, and a forum;

the answer is a sample answer;

the one or more processing circuits are further configured to summarize the sample question and the sample answer subjected to the semantic understanding as SPO language fragments represented as word vectors {S, P, O}, calculate an angle and/or distance between a question word vector corresponding to the sample question and an answer word vector corresponding to the sample answer;

determine a correlation between every sample question and every sample answer based on a calculation result, with smaller angle between the question word vector and the answer word vector and smaller distance between the question word vector and the answer word vector representing greater correlation;

wherein the correlation is represented by a three-component group {Q, R, s}, where Q represents the sample question, R represents the sample answer, and s represents a correlation between the sample question and the sample answer; and based on a value of s, the correlation between the sample question and the sample answer is classified as a strong correlation when s is greater than a first preset value, a weak correlation when s is smaller than the first preset value and greater than a second preset value, and irrelevant when s is smaller than the second preset value.

12. The non-transitory computer-readable storage medium of claim 11, wherein the determining the correlation between the sample question and the sample answer subjected to the semantic understanding comprises:

determining the correlation between the sample question and the sample answer subjected to the semantic understanding based on the angle and/or distance.

13. The non-transitory computer-readable storage medium of claim 11, wherein the determining the correlation between the sample question and the sample answer subjected to the semantic understanding comprises:

obtaining quality information of the sample answer and/or information of a user providing the sample answer;

determining a first correlation between the sample question and the sample answer subjected to the semantic understanding based on the quality information and/or information of the user;

determining a second correlation between the sample question and the sample answer subjected to the semantic understanding based on an angle and/or distance between a question word vector corresponding to the sample question and an answer word vector corresponding to the sample answer; and determining the correlation between the sample question and the sample answer subjected to the semantic understanding based on the first correlation and the second correlation.

14. The non-transitory computer-readable storage medium of claim 11, wherein the sample question comprises a question received from a public media for the target product, and/or a question received after sales for the target product; and the sample answer comprises an answer corresponding to the question received from the public media for the target product, and/or an answer corresponding to the question received after sales for the target product.

15. The non-transitory computer-readable storage medium of claim 11, wherein, in response to determining a plurality of answers, the method further comprises:

determining a plurality of correlations between the plurality of answers and the question based on the knowledge graph;

sorting the plurality of answers based on a descending order of the plurality of correlations; and outputting the sorted plurality of answers.

\* \* \* \* \*